UNITED STATES PATENT OFFICE.

UTLEY WEDGE, OF ARDMORE, PENNSYLVANIA, ASSIGNOR TO THE FURNACE PATENT COMPANY, OF PHILADELPHIA, PENNSYLVANIA, A CORPORATION OF PENNSYLVANIA.

RECOVERING COPPER FROM ITS ORES.

1,063,629.  Specification of Letters Patent.  Patented June 3, 1913.

No Drawing.   Application filed October 18, 1909.  Serial No. 523,179.

*To all whom it may concern:*

Be it known that I, UTLEY WEDGE, a citizen of the United States, residing in Ardmore, Pennsylvania, have invented certain Improvements in Recovering Copper from its Ores, of which the following is a specification.

The object of my invention is to provide a commercially practicable method of recovering copper from copper oxids or copper carbonates whose values have, in many cases, not been utilized because of difficulties in their treatment by ordinary smelting or blast furnace methods. In some cases, these ores have been of such a character as to make concentration or separation of values by gravity methods impossible, and in other cases, by reason of the physical or chemical character of the ore, or the gangue contents, it has not been commercially practicable to secure the values by fusion in blast furnaces or other smelting furnaces. Such oxids or carbonates have first been treated so as to reduce the copper to the form of a sulfate, whereby the latter, being soluble in water, can be readily washed out and the copper precipitated or extracted from the solution by known methods.

My invention consists of an improved form of such process.

In carrying out my invention, I preferably employ a furnace having a plurality of superposed hearths, the material being first deposited on the uppermost hearth, and then fed downward from hearth to hearth, the furnace having a central rotating shaft provided in each working chamber with arms carrying blades or rabbles, which stir or agitate the material upon the hearth, and feed the same from the inlet zone to the outlet zone of said hearth.

An effective method of treating the copper ores for the purpose of effecting the desired reaction is to reduce them to a powdered or granular condition and then mix them with a powdered or granulated sulfid of another metal, as for example, iron pyrites, and to treat the mixture on the hearth or hearths of the furnace under oxidizing conditions at a temperature at which the sulfid of iron will be converted into sulfate of iron, which in turn will react on the oxid of copper to form copper sulfate. In the case of pyrites the furnace temperature necessary for producing this result is approximately from 800° F. to 1000° F. At a temperature higher than this the iron sulfid will be roasted to oxid of iron without forming sulfate of iron, in which case little or no sulfate of copper will be produced. Even at the lower temperature, some sulfur dioxid or sulfuric anhydrid gas will be formed, and, in carrying out my invention in a furnace having a plurality of superposed hearths, into which the material is introduced upon the upper hearth and then fed downwardly through the furnace from hearth to hearth, I prefer also to cause a down draft of the gases evolved from the material under treatment, so that said material will be subjected to the action of such gases from the time it enters the furnace until it leaves the same. I have found that this tends to increase, in practice, the conversion of copper oxid to copper sulfate in the process described, as does also the constant stirring or agitation of the mass of ore during the treatment.

There are sulfids of some other metals which would act in the manner described, but the very common occurrence of sulfids of iron, such as iron pyrites or pyrrhotite, makes this the cheapest and most readily available form of sulfid for use in carrying out my improved process.

The quantity of pyrites employed may vary, depending upon the character of the ore under treatment or the pyrites used, but in many cases a quantity as low as five per cent., by weight, based on the quantity of copper oxid or carbonate ore charged into the furnace, will be found to be sufficient.

Either an open furnace, in which the heating gases are permitted to enter the treating chambers, may be used, or the furnace may be a muffle furnace, in which the heating gases are excluded from such treating chambers, or the furnace may combine both of such constructions.

I claim:

The mode herein described of recovering copper from copper ore, said mode consisting in subjecting the ore under oxidizing conditions and in the presence of a sulfate of another metal to such temperature that the sulfate will react upon the copper to form copper sulfate, progressively moving the mass of ore during its treatment, and conveying the gases developed during the first part of the treatment to a point in advance of that at which they were developed and there causing said gases to act upon the partially sulfated ore.

In testimony whereof, I have signed my name to this specification, in the presence of two subscribing witnesses.

UTLEY WEDGE.

Witnesses:
CHAS. BENTLEY COLLINS,
KATE A. BEADLE.